May 26, 1936.  G. E. BARNHART  2,041,688
AIRPLANE CONSTRUCTION
Filed July 30, 1934  4 Sheets-Sheet 2

INVENTOR.
G. E. BARNHART.
BY
ATTORNEY

Patented May 26, 1936

2,041,688

UNITED STATES PATENT OFFICE 2,041,688

AIRPLANE CONSTRUCTION

George E. Barnhart, Pasadena, Calif.

Application July 30, 1934, Serial No. 737,622

21 Claims. (Cl. 244—29)

This invention relates to improvements in airplanes.

The general object of the invention is to provide novel means for controlling an airplane while in flight.

A further object of the invention is to provide novel means for retarding the landing speed of an airplane.

A more specific object of the invention is to provide easily operated, self-balancing means for controlling the air flow over the wing of an airplane.

An additional object of the invention is to provide novel lateral balance control for an aerofoil.

A further object of the invention is to provide novel means for effecting the lateral control or the longitudinal control of an airplane by projecting a surface which is on the top of the wing into the airstream.

An additional object of the invention is to provide an aerofoil with a main flap and a pilot flap to relieve the effort required to operate the main flap.

Another object of the invention is to provide a novel aircraft rudder.

Other objects and the advantages of this invention will be apparent from the following description taken in connection with the accompanying drawings wherein.

Figure 1:
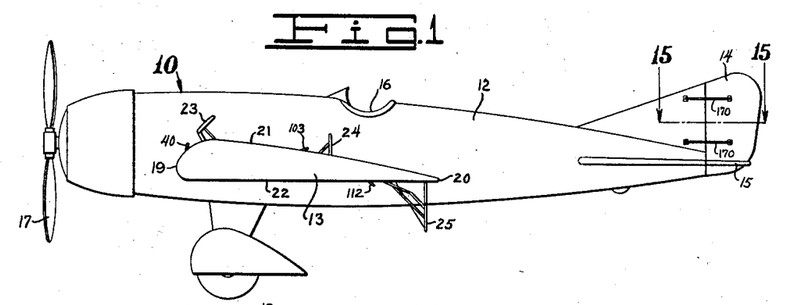
Fig. 1 is a side elevation of an airplane embodying the features of my invention.
Figures 2, 3, 4:
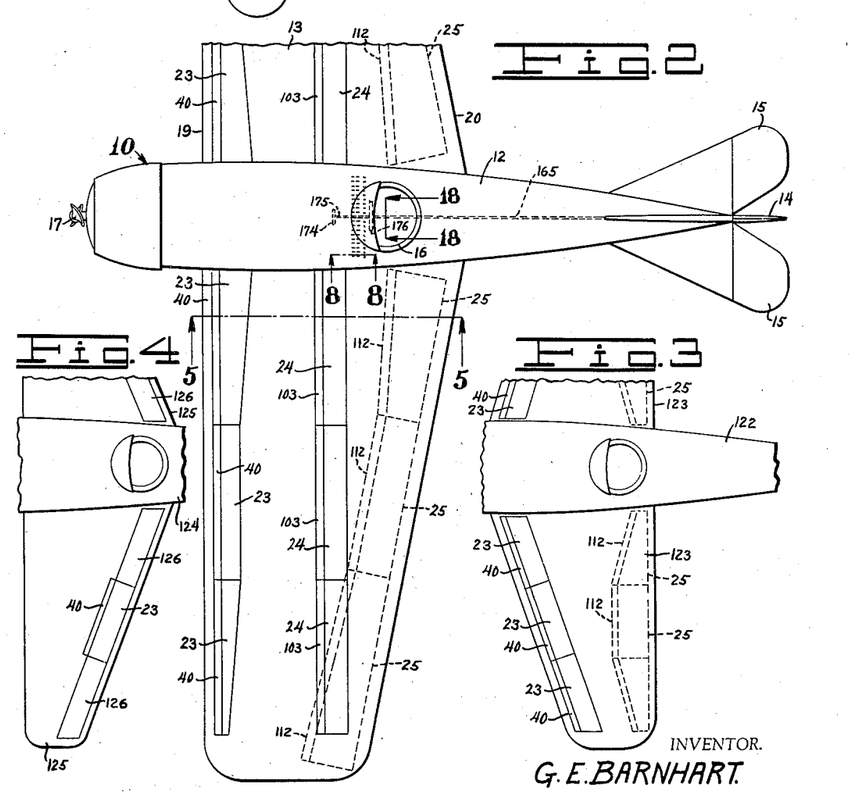
Fig. 2 is a top plan view of the airplane shown in Fig. 1.
Fig. 3 is a fragmentary view similar to Fig. 2 on a reduced scale showing another type of wing.
Fig. 4 is a view similar to Fig. 3 showing an additional type of wing.

Referring to the drawings by reference characters I have indicated an airplane embodying the features of my invention generally at 10. The airplane 10 is of the monoplane type and includes the usual fuselage 12, wings 13, rudder 14, stabilizer 15, control cockpit 16 and propeller 17. In general the wing 13 is of hollow construction and stream line in cross section and including a leading edge 19 and a trailing edge 20, an upper surface 21 and a lower surface 22. As shown in Fig. 2 the wing 13 is of the type wherein the leading edge is straight with the trailing edge inclined rearwardly towards the fuselage.

Adjacent the leading edge of the wing 13 in the upper surface 22 thereof I provide a plurality of flaps 23 and intermediate the flaps 23 and the trailing edge 20 in the upper surface of the wing I provide a plurality of flaps 24 while adjacent the trailing edge 20 in the under surface of the wing I provide a plurality of flaps 25.

Figures 5, 6, 7:
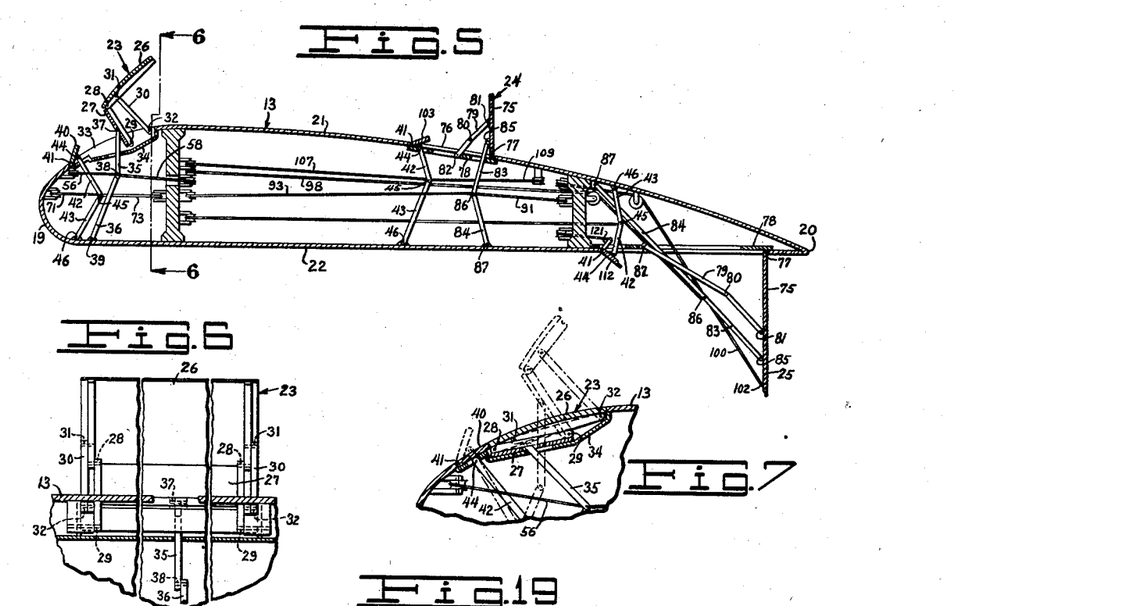
Fig. 5 is an enlarged section taken on line 5—5 of Fig. 2.
Fig. 6 is an enlarged section taken on line 6—6 of Fig. 5.
Fig. 7 is an enlarged fragmentary section similar to Fig. 5 showing one of the wing flaps in a closed position.

Each of the flaps 23 are preferably identical and I will proceed to describe but one of them. As shown in Fig. 5 each flap includes an upper section 26 and a lower section 27. The upper section 26 is pivotally connected to the lower section as at 28 and the lower section is pivotally connected to a portion of the wing structure as at 29. The pivot 29 is positioned at the rear of the pivot 28 so that when the flap 23 is open as shown in Fig. 5 the lower portions 27 incline upwardly and the upper portions 26 incline rearwardly and upwardly.

Adjacent each end of the flaps 23 I provide a brace 30 one end of which is pivotally secured to the upper portion 26 of the flap as at 31 and the opposite end is pivotally secured to a portion of the wing structure as at 32 at the rear of the pivot 29.

The flap 23 is positioned in an aperture 33 in the upper surface 21 of the wing so that when the flap is in a closed position as shown in Fig. 7 the flap portions 26 form a surface which is continuous with the upper surface 21 of the wing. Below the flaps 23 I provide a housing member 34 which closes the wing apertures 33 and prevents the flow of air into the wing when the flap is open.

For actuating the flap 23 I provide a line mechanism which includes a bar 35 and a bar 36. One end of the bar 35 is pivotally secured to the flap portion 27 as at 37 and the opposite end of the bar 35 is pivotally secured to the bar 36 as at 38 and the opposite end of the bar 36 is pivotally secured to the wing structure as at 39. When the link pivot 38 is shifted forward the bar 35 swings the flap 23 upward to an open position as shown in Fig. 5 and when the link pivot 38 is moved rearward the bar 35 swings the flap downward to a closed position as shown in Fig. 7.

By arranging the brace 30 so that it retains the upper and lower portions of the flap inclined rearward when the flap is open as shown in Fig. 5 the air pressure on the upper portion 26 of the flap tends to move the flap to a closed position while the air pressure on the lower portion 27 of the flap tends to force the flap open thereby lessening the strain on the flap control mechanism.

Positioned in the wing aperture 30 forward of the flap 23 I provide a pilot flap 40. The pilot flap 40 is pivotally secured adjacent its leading edge to the wing structure as at 41 and when open inclines upwardly and rearwardly, as shown in Fig. 5.

For actuating the pilot flap 40 I provide a lever mechanism which includes a bar 42 and a bar 43. One end of the bar 42 is pivotally secured to the flap 40 as at 44 and the opposite end is pivotally secured to one end of the bar 43 as at 45 and the opposite end of the bar 43 is pivotally secured to a portion of the wing as at 46. When the pivot 45 of the lever mechanism is moved forward the bar 42 swings the pilot flap upward to an open position as shown in Fig. 5 and when the pivot 45 is moved rearward the bar 42 swings the pilot flap downward to a closed position as shown in Fig. 7.

Figures 8, 9, 19:
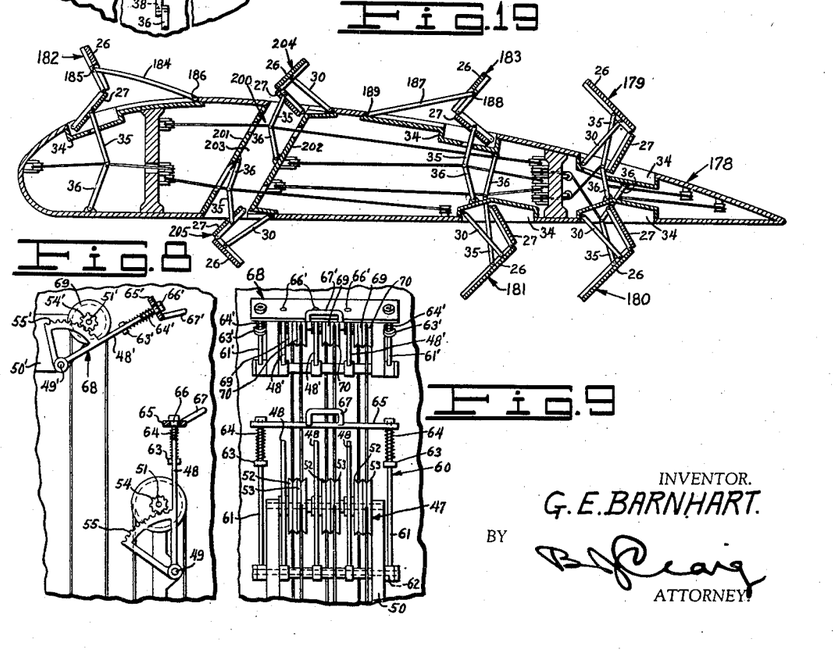
Fig. 8 is an enlarged fragmentary section taken on line 8—8 of Fig. 2 showing the control mechanism for the wing flaps.
Fig. 9 is a front view of the mechanism shown in Fig. 8.
Fig. 19 is a section similar to Fig. 5 showing a modified form of wing flap.
Figures 10, 18:
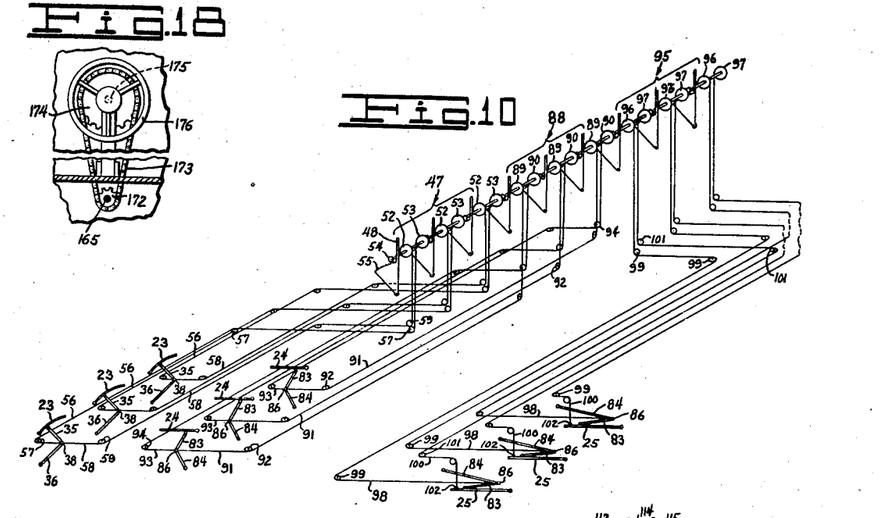
Fig. 10 is a diagrammatic view showing the control mechanism for the main wing flaps.
Fig. 18 is an enlarged fragmentary section taken on line 18—18 of Fig. 2.

For operating the flaps 23 I provide a control mechanism which I have indicated generally at 47 and shown in detail in Figs. 8 and 9 and diagrammatically in Fig. 10. The control mechanism 47 is located in the cockpit 16 and includes three levers 48 for each wing and one lever for each of the flaps 23. Each of the levers 48 is pivotally mounted as at 49 on a suitable supporting frame 50.

Rotatably mounted on a shaft 51 adjacent the levers 48 I provide a set of two drums 52 and 53 for each of the levers and for each set of drums I provide a gear 54. Each set of drums 52 and 53 and their associated gear 54 is secured together and is freely rotatable on the shaft 51. On each of the levers 48 I provide a gear segment 55 which meshes with the gear 54 of the associated set of drums. Thus when one of the levers 48 is swung about its pivot 49 the gear segment 55 will rotate its associated gear 54 which in turn will rotate its associated drums 52 and 53.

As shown in Fig. 10 one end of a cable 56 is secured to the drum 53 and is rove over a plurality of guide pulleys 57 and is secured to the flap operating lever mechanism adjacent the pivot 38 thereof. The cable 56 is rove to approach the lever mechanism from the front thereof. A similar cable 58 is secured to the drum 52 and is rove over a plurality of guide pulleys 59 and like the cable 56 is secured to the flap operating lever mechanism adjacent the pivot 38 thereof. The cable 58 is rove to approach the lever mechanism from the rear.

When one of the levers 48 is swung rearwardly it rotates its associated set of drums 52 and 53 as previously described and when the drums are thus rotated the cable 56 pulls the bars 35 and 36 forward thereby swinging the flap 23 to an open position as previously described. Thereafter, when the lever 48 is swung forward the drums 52 and 53 are rotated in a reverse direction whereupon the cable 58 pulls the bars 35 and 36 rearwardly thereby swinging the flap 23 to a closed position as previously described.

For operating all the flaps 23 on the wing simultaneously I provide an operating mechanism indicated generally at 60. As shown the device 60 includes a pair of spaced arms 61 which are pivotally supported on the frame 50 as at 62. Adjacent the upper end of each of the arms 61 I provide a collar 63 and surrounding each arm above the collars 63 I provide a coil spring 64. Supported on the springs 64 I provide a bar 65 which is spaced above the levers 48 and includes apertures 66 to receive the levers 48. The arms 61 extend through suitable apertures in the bar 65 so that the bar 65 can be moved downward against the action of the spring 64. When the operator wishes to actuate all the levers 48 simultaneously he grasps a handle portion 67 on the bar 65 and moves the bar 65 downward against the action of the springs 64 until the levers 48 are positioned in the apertures 66 of the bar. Thereafter by swinging the bar 65 rearward all the levers 48 will be swung rearward to open their associated flaps 23 and when the bar 65 is swung forward all the levers 48 will be swung forward to close their associated flaps 23.

Figure 11:
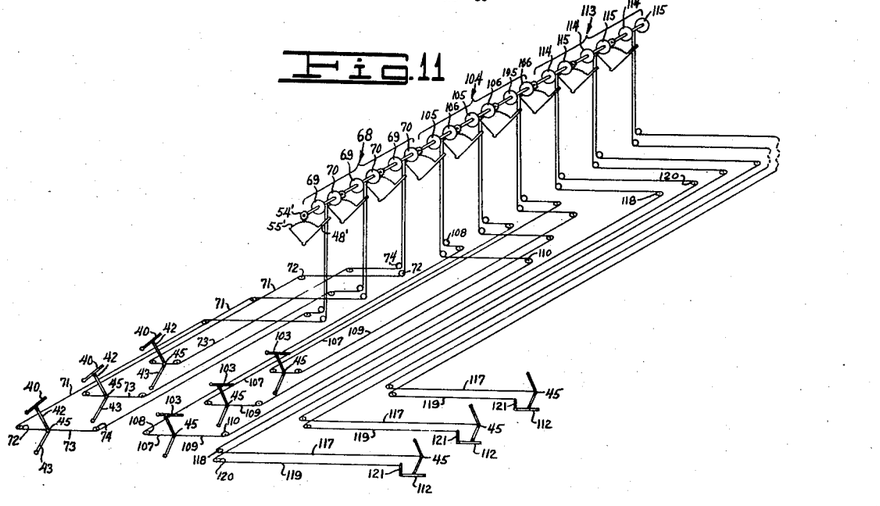
Fig. 11 is a view similar to Fig. 10 showing the control mechanism for the pilot flaps.

For operating the pilot flaps I provide a control mechanism which I have indicated generally at 68 and shown in detail in Figs. 8 and 9 and diagrammatically in Fig. 11. The control mechanism 68 is located in the cockpit 16 and is shown as positioned above the control mechanism 47. The control mechanism 68 is similar in all respects to the previously described control mechanism 40 and like parts thereof are indicated by similarly primed reference numerals with the exception of the drums which are indicated at 69 and 70.

For each of the pilot flaps 40 one end of a cable 71 is secured to the drum 70 and rove over a plurality of guide pulleys 72 and is secured to the pilot flap operating levers adjacent the pivot 45 thereof. The cable 71 approaches the lever mechanism from the front thereof. One end of a cable 73 is secured to the drum 69 and rove over a plurality of guide pulleys 74 and is secured to the operating levers adjacent the pivot 45 thereof. The cable 73 approaches the operating levers from the rear thereof. The opening and closing operations for the pilot flaps 40 is similar to that previously described in connection with the main flaps 23.

When the operator desires to open the main flaps 23 he preferably first opens the pilot flaps 40 and thereafter the main flaps 23. By opening the pilot flaps 40 first these flaps direct the air stream upward whereupon less effort is required to open the main flaps 23. When the main flaps are opened the air pressure thereagainst retards the forward motion of the airplane. Furthermore, by opening various ones of the flaps 23 the direction of flight of the plane may be changed.

The flaps 24 and 25 are similar and each includes a single section 75 which is positioned in an aperture 76 in the wing and pivoted adjacent its rear edge to the wings as at 77. When the flap section 75 is in a closed position the outer surface thereof is continuous with the adjacent surface of the wing. Below the wing aperture 76 I provide a closure 78 to restrict the passage of air into the wing when the flap is open. Adjacent each end of each of the flap sections 75 I provide a brace member 79 which is pivoted intermediate its length as at 80 and at one end is pivotally secured to the flap section 75 as at 81 and at the opposite end is pivotally secured to the wing structure as at 82.

For swinging the flap section 75 about its pivot 77 I provide a lever device which includes a bar 83 and a bar 84. The bar 83 is pivotally secured at one end to the flap section 75 as at 85 and at the opposite end is pivotally secured to one end of the bar 84 as at 86 and the opposite end of the bar 84 is pivotally secured as at 87 to the wing structure.

As indicated at 88 in Fig. 10 the control mechanism for the flaps 24 is similar to the previously described control mechanism 47 and is indicated by similar reference numerals with the exception of the drums which are indicated at 89 and 90. For each of the flaps 24 one end of a cable 91 is secured to the drums 89 and rove over suitable guide pulleys 92 and is secured to the operating levers adjacent their pivots 86. The cable 91 approaches the operating levers from the rear thereof and when pulled actuates the operating levers to swing the flaps 24 to an open position. One end of a cable 93 is secured to the drum 90 and is rove over a plurality of guide pulleys 94 and is secured to the operation levers adjacent their pivot 86 similar to the cable 91. The cable 93 approaches the operating levers from the front thereof and when pulled actuates the operating levers to swing the flaps 24 to a closed position.

In Fig. 10 I have indicated the control mechanism for the flaps 25 generally at 95. The control mechanism 95 is similar to the previously described control mechanism 45 and is indicated by similar reference characters with the exception of the drums which are indicated at 96 and 97. For each of the flaps 25 one end of a cable 98 is secured to the drum 96 and rove over a plurality of guide pulleys 99 and is secured to the flap operating levers adjacent their pivot 86. The cable 98 approaches the operating levers from the front thereof and when the cable 98 is pulled it actuates the operating levers to swing the flap 25 to an open position.

One end of a cable 100 is secured to the drum 97 and rove over a plurality of guide pulleys 101 and is secured to the flap section 75 as at 102. When the cable 100 is pulled it swings the flap 25 upward to a closed position.

Positioned in the wing apertures 76 in front of each of the flaps 24 I provide pilot flaps 103 which are similar in all respects to the previously described pilot flaps 40 and like portions thereof are indicated by similar reference numerals.

In Fig. 11 I have indicated the control mechanism for the pilot flaps 103 generally at 104. The control mechanism 104 is similar to the previously described control mechanism 68 and like portions thereof and are indicated by similar reference numerals with the exception of the drums which are indicated at 105 and 106.

For each of the pilot flaps 103 one end of a cable 107 is secured to the drum 106 and rove over suitable guide pulleys 108 and is secured to the flap operating levers adjacent their pivot 45. The cable 107 approaches the operating levers from the front thereof and when pulled actuates the operating levers to swing the pilot flap 103 to an open position. One end of a cable 109 is secured to the drum 105 and is rove over a plurality of guide pulleys 110 and is secured to the flap operating levers adjacent their pivot 45. The cable 109 approaches the operating levers from the rear thereof and when pulled actuates the levers to swing the pilot flap 103 to a closed position.

Positioned in the wing apertures 76 in front of each of the main flaps 25 I provide a pilot flap 112. The pilot flaps 112 like the pilot flaps 103 are similar to the pilot flaps 40 and like portions thereof are indicated by similar reference characters.

In Fig. 11 I have indicated the control mechanism for the pilot flaps 112 generally at 113. The control mechanism 113 is similar to the previously described control mechanism 68 and like portions thereof are indicated by similar reference numerals with the exception of the drums which are indicated at 114 and 115.

For each of the pilot flaps 112 one end of a cable is secured to the drum 114 and rove over a plurality of guide pulleys 118 and is secured to the flap operating levers adjacent their pivot 45. When the cable 117 is pulled it actuates the flap operating levers to swing the pilot flap 112 to an open position. One end of a cable 119 is secured to the drum 115 and is rove over a plurality of guide pulleys 120 and is secured to an arm 121 provided on the pilot flap 112 to a closed position.

In Fig. 3 I have shown an airplane 122 having wings 123 thereof. The trailing edge of the wing 123 is straight while the leading edge tapers forwardly from the tip of the wing to the fuselage. Adjacent the leading edge of the wing 123 and in the upper surface thereof I have shown a plurality of the main flaps 23 with their associated pilot flaps 40 and in the under surface of the wing adjacent the trailing edge thereof I have shown a plurality of the main flaps 25 and their associated pilot flaps 112.

In Fig. 4 I have shown an airplane 124 having wings 125 thereon which are similar to the wings 13 but having less width at their tips. Adjacent the trailing edge of each of the wings and intermediate the length thereof I have shown one of the main flaps 23 with its associated pilot flaps 40. At each side of the flap 23 I have indicated flaps 126 which are similar to the flaps 23 with the exception that the pivot 29 and the braces 30 are arranged so that the flaps 126 open forward instead of rearward like the flaps 23.

Figure 12:
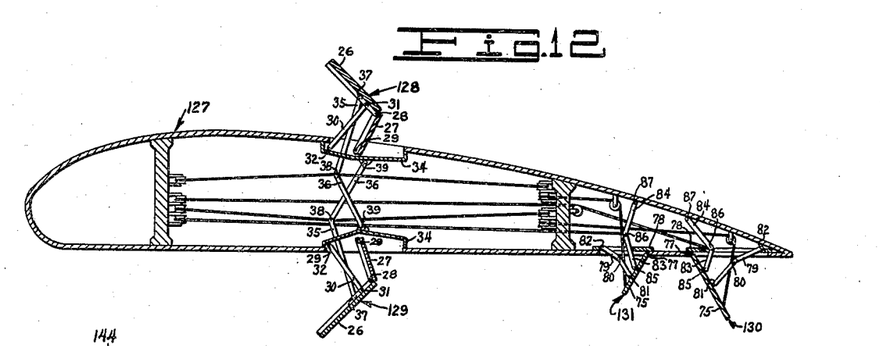
Fig. 12 is a view similar to Fig. 5 showing a different arrangement of the wing flaps.

In Fig. 12 I have indicated a wing generally at 127 which is similar to the previously described wing 13. Intermediate the width of the wing 127 in the upper surface thereof I provide a flap 128 and directly therebelow in the under surface of the wing I provide a flap 129. The flaps 128 and 129 are similar in construction to the previously described flaps 23 and like portions thereof are indicated by similar reference numerals. The flaps 128 and 129 are arranged the reverse of the flaps 23. That is, the lower flap portion 27 inclines upwardly and rearwardly when the flap is open instead of forwardly as does the lower portion of the flap 23 and the upper portion of the flaps 128 and 129 incline forwardly instead of rearwardly as does the upper portion of the flap 23.

In the under surface of the wing 127 adjacent the trailing edge thereof I provide a flap 130 which is similar in construction to the previously described flap 25 and like portions thereof are indicated by similar reference characters. The flap 130 is arranged to open forwardly instead of rearwardly as is the flap 25.

Spaced forward of the flap 130 in the under surface of the wing 127 I provide a flap 131 which is similar in construction to the previously described flap 25 and like portions thereof are indicated by similar reference numerals. The flap 131 like the flap 25 is arranged to open rearwardly. The flap 130 from its pivot 77 to its free edge has a greater length than the flap 131 so that when the flap 131 is open it does not completely blanket the flap 130.

Figure 13:
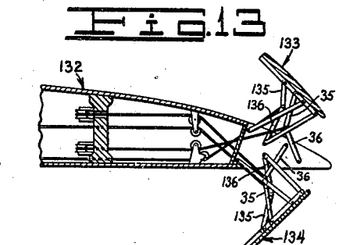
Fig. 13 is a fragmentary view similar to Fig. 12 showing another arrangement of the wing flaps.

In Fig. 13 I have shown a fragmentary section of an airplane wing 132. In the upper surface of the wing 132 at the trailing edge thereof I provide a flap 133 and directly therebelow I provide a flap 134. The flaps 133 and 134 are similar in construction to the flaps 128 and 129 and like portions thereof are indicated by similar reference numerals. In addition to the operating levers 35 and 36 the flaps 133 and 134 include another set of similar operating levers 135 and 136. The levers 135 and 136 are provided to open the flaps and the levers 35 and 36 to close the flaps.

Figure 14:
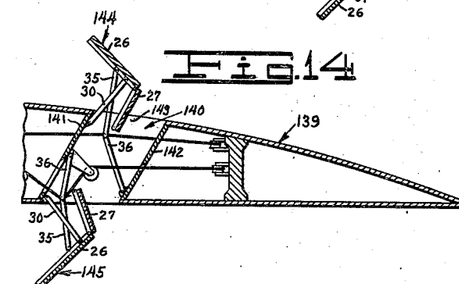
Fig. 14 is a fragmentary view similar to Fig. 12 showing a still further arrangement of the wing flaps.

In Fig. 14 I have shown a fragmentary section of an airplane wing at 139. Intermediate the leading edge and the trailing edge of the wing 139 I provide an air chute 140 through the wing. The chute 140 includes a front wall 141 a rear wall 142 and side walls 143 and opens through the upper and lower surfaces of the wing. The front and rear walls of the chute 140 are preferably inclined upwardly and rearwardly as shown.

Positioned in the chute 140 adjacent the upper surface of the wing I provide a flap member 144 and adjacent the under surface of the wing I provide a flap member 145. The flaps 144 and 145 are similar in construction to the flaps 128 and 129 shown in Fig. 12 and like portions thereof are indicated by similar reference numerals. The flap 144 when in a closed position closes the upper end of the chute 140 and the upper surface of the upper section 26 of the flap lies flush with the wing surface. When the flap 145 is in a closed position it closes the lower end of the chute 140 and the under surface of the flap section 26 lies flush with the under surface of the wing. When both the flaps 144 and 145 are open as shown in Fig. 14 the air pressure against the flaps retards the forward motion of the airplane and at the same time air passes through the chute 140 from the underside of the wing to the upper side thereof.

Figures 15, 16, 17:
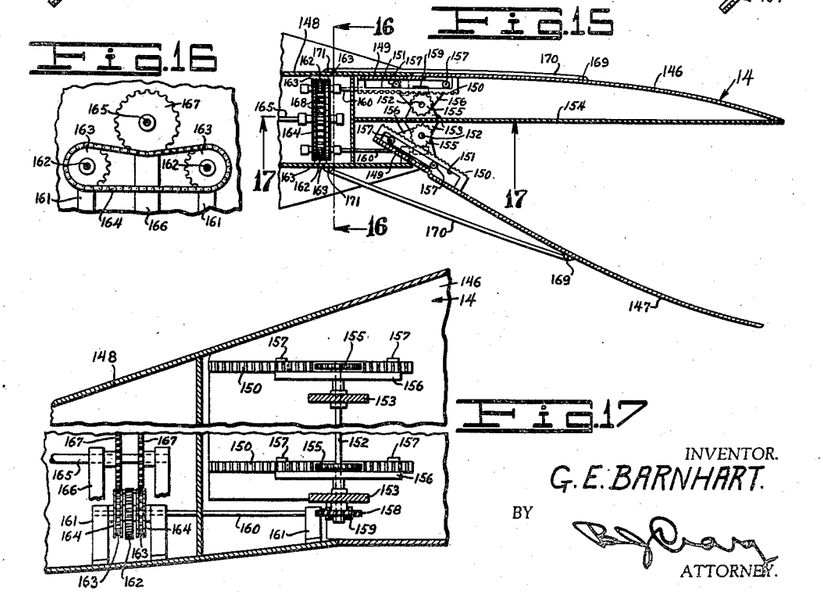
Fig. 15 is an enlarged section taken on line 15—15 of Fig. 1.
Fig. 16 is an enlarged fragmentary section taken on line 16—16 of Fig. 15.
Fig. 17 is an enlarged fragmentary section taken on line 17—17 of Fig. 15.

As shown in Fig. 15 the rudder 14 of the airplane 10 is of novel construction. The rudder 14 includes two vertical sections 146 and 147, the forward edges of which are inside of the sides of the adjacent fin 148, as indicated, at 149. Adjacent the inner edge of each of the rudder sections 146 and 147 I provide a pair of vertically spaced gear toothed racks 150. The racks 150 are spaced from the inner face of the rudder section to form a slot 151. Adjacent each set of the racks 150 I provide a vertical shaft 152 which is journalled in brackets 153 which are mounted on a vertical wall 154 which extends rearwardly from the fin 148 between the rudder sections. Secured to the shaft 152 adjacent each of the racks 150 I provide a gear 155 which meshes with their associated racks 140. Loosely mounted on the shaft 152 below each of the gears 155 I provide a bracket 156 on which I provide rollers 157. The rollers 157 are positioned in the gear rack slots 151 and retain the gears in mesh with their associated racks.

Secured to each shaft 152 adjacent the lower end thereof I provide a worm gear 158 which meshes with a worm pinion 159 secured to a shaft 160. The shafts 160 are journalled in bearings 161 and each have a sprocket 162 secured thereto. At each side of each of the sprockets 162 I provide a pair of sprockets 163 which are loosely mounted on their associated shafts 160. The sprockets 163 of one shaft 160 are connected to the sprockets 163 on the other shaft 160 by chains 164 and intermediate the shafts 163 and above the chains 164 I provide a shaft 165 journalled in suitable bearings 166. Secured to the shaft 165 I provide a pair of spaced sprockets 167 which engage the upper reach of the chains 164.

From adjacent the center of one of the shafts 160 to adjacent the center of the other shaft 160 the upper reaches of the chains 164 are connected by cross bars 168 (see Fig. 15) which when the chains 164 are moved in one direction engage the sprocket 163 associated with the rudder section 146 and rotate the associated shaft 160 and when the chains 164 are moved in the opposite direction the bars 168 engage the sprocket 163 associated with the rudder section 147 and rotate the associated shaft 160. Pivotally secured to each of the rudder sections 147 and 146 as at 169 I provide a pair of spaced rods which extend forward and are pivotally secured to the fin 148 as at 171.

When the shaft 160 of one rudder section is rotated in one direction as previously described the worm pinion 159 rotates the worm gear 158 which in turn rotates the shaft 152 and the gears 155. As the gears 155 rotate they move their associated racks 150 rearward which in turn tend to move the associated rudder section rearward but the rods 170 cause the rudder section to swing sideways about the axis of the shaft 152. At the same time the rudder section swings sideways it also moves rearward whereupon when the rudder section is in an open position there is more exposed surface beyond the fin 148 than when the rudder section is in a closed position. When the shaft 160 is rotated in the opposite direction the gears 155 move the racks 150 forwardly and the rods 170 cause the rudder section to swing inwardly about the axis of the shaft 152.

The shaft 165 extends forward to the cockpit 16 where a sprocket 172 is secured thereto (see Figs. 2 and 18.) The sprocket 172 is connected by a sprocket chain 173 to a sprocket 174 which is secured to the shaft 175 of the steering wheel 176 of the airplane.

In Fig. 19 I have shown a wing section at 178. In the upper surface of the wing 178 adjacent the trailing edge thereof I provide a flap 179 and directly therebelow in the under surface of the wing I provide a flap 180 and forward of the flap 180 I provide a flap 181. The flaps 179, 180 and 181 are similar in construction to 128 and 129 shown in Fig. 12 and the like parts thereof are indicated by similar reference numerals.

In the upper surface of the wing 178 adjacent the leading edge thereof I provide a flap 182 and intermediate the flap 179 and the flap 182 I provide a flap 183. The flap 182 is arranged similar to the flap 128 in Fig. 12 and like portions thereof are indicated by similar reference numerals. The braces thereof are indicated by similar reference numerals. The braces 30 of the flap 128 are omitted in the flap 182 and other brace members 184 are provided. The brace members 184 are pivotally secured as at 185 to the section 26 of the flap 182 and extend rearwardly and are pivotally secured as at 186 to a portion of the wing structure as indicated at 187.

The flap 183 is arranged similar to the flap 23 in Fig. 5 and like portions thereof are indicated by similar reference numerals. The braces 30 of the flap 23 are omitted and other brace members 187 are provided. The brace members 187 are pivotally secured as at 188 to the section 26 of the flap 183 and extend forwardly and are pivotally secured as at 189 to a portion of the wing structure.

Intermediate the flaps 182 and 183 I provide an air chute 200 through the wing similar to the air chute 140 shown in Fig. 14. The chute 200 includes a front wall 201, a rear wall 202, and side walls 203 and opens through the upper and lower surfaces of the wing. Like the chute 140, the front and rear walls of the chute 200 are preferably inclined upwardly and rearwardly as shown.

Positioned in the chute 200 adjacent the upper surface of the wing I provide a flap member 204 and adjacent the under surface of the wing I provide a flap member 205. The flap members 204 and 205 are similar in construction to the flap member 23 shown in Fig. 5 and like portions thereof are indicated by similar reference numerals. The flap 204 when in a closed position closes the upper end of the chute 200 and the upper surface of the upper section 26 of the flap lies flush with the upper surface of the wing surface. When the flap 205 is in a closed position it closes the lower end of the chute 200 and the under surface of the flap section 26 lies flush with the under surface of the wing. When both the flaps 204 and 205 are open as shown the air pressure against the flaps retards the forward motion of the airplane and at the same time air passes through the chute 200 from the under side of the wing to the upper side thereof.

Chutes similar to the chutes 140 and 200 with their associated flap members may be provided at any position desired between the leading edge and the trailing edge of a wing.

From the foregoing description it will be apparent that I have invented a novel air plane construction which is highly efficient in use.

Having thus described my invention, I claim:

1. In combination with an airplane having a fuselage including a control cockpit and wings extending from opposite sides thereof, the upper surface of said wings having a recess, a vane member positioned in said recess, said vane member comprising two sections, one of said sections being hinged to said wing structure, the other of said sections being hinged to the free end of the first section, said vane being movable from closed position to open position, said vane in a closed position being folded within said recess with the outer surface of said vane substantially flush with the adjacent upper surface of said wing.

2. In combination with an airfoil including a leading edge and a trailing edge, said airfoil having a recess, a vane member comprising a pair of sections having their ends hinged together and positioned in said recess, means to pivotally secure the end portion of one of said vane sections to said airfoil and means to swing said vane member outward from a position in said recess and other means to swing said vane from an extended position into said recess.

3. In combination with an airplane having a fuselage including a control cockpit and wings extending from opposite sides thereof, a recess in the upper surface of each wing, a vane member positioned in each of said recesses said vane member comprising two sections, one of said sections being hinged to said wing structure, the other of said sections being hinged to the free end of the first section said vanes being movable from a closed position to open position, said vanes in a closed position being folded within said recesses, said vanes when in an open position being directed upwardly and means in said cockpit to actuate said vanes.

4. In combination with an airfoil including a leading edge and a trailing edge, said airfoil having a recess, a vane member in said recess, said vane member including two sections hinged together, means to hinge one of said sections to said airfoil, said vane being movable from a closed position to an open position, said vane when in a closed position having the exposed surface of the outer of said sections flush with the adjacent surface of said airfoil, said vane when in an open position having the section hinged to said airfoil inclined away from said airfoil towards said trailing edge and having the other section inclined away from said airfoil towards said leading edge.

5. In combination with an airfoil including a leading edge and a trailing edge, said airfoil having a recess, a vane member in said recess, said vane member including two sections, means to hinge one end of one of said sections to said airfoil, means to hinge the other end of said one section to one end of said second section, said vane being movable from a closed position to an open position, said vane when in a closed position having the exposed surface of the outer of said sections flush with the adjacent surface of said airfoil, said vane when in an open position having the section hinged to said airfoil inclined away from said airfoil towards said leading edge and having the other section inclined away from said airfoil towards said trailing edge.

6. In combination with an airplane having a fuselage including a control cockpit and wings extending from opposite sides thereof, the upper surface of said wings having recesses, a vane member positioned in each of said recesses, each of said vane members including two sections hinged together, one of said vane sections being hinged to said wing structure, said vanes being movable from closed position to open position, said vanes in a closed position being folded within said recess with the outer surface of one section of said vane flush with the adjacent upper surface of said wing, said vanes when in an open position having the lower section thereof inclined forwardly and upwardly and having the upper section thereof inclined rearwardly and upwardly and means in said cockpit to actuate said vanes from closed position to open position and from open position to closed position.

7. In combination with an airfoil including a leading edge and a trailing edge, said airfoil having a recess, a vane member positioned in said recess, the rear edge of said vane being hinged to said airfoil, said airfoil having a second recess forward of said first recess, a vane member in said second recess, the front edge of said second vane being hinged to said airfoil, the distance between the hinged edge of said second vane and the opposite edge thereof being less than the corresponding distance of said first vane, means to swing said vanes outward from positions in said recesses and other means to swing said vanes from their extended positions into said recesses.

8. In combination with an airfoil including a leading edge, a trailing edge, an upper surface and a lower surface, said airfoil having a passageway intermediate said leading edge and said trailing edge, said passageway opening through said upper surface and through said lower surface of said airfoil, a vane member positioned in said passageway adjacent the upper end thereof and a vane member positioned in said passageway adjacent the lower end thereof, each of said vanes including two sections hinged together and with one of said sections of each pair hinged to said airfoil, said vanes being movable from closed positions to open positions, said vanes when in closed positions having the exposed surface of the outer of said vane sections flush with the adjacent surfaces of said airfoil, said vanes when in open position having the inner and outer sections inclined in different directions.

9. In combination with an airplane including a control cockpit and a supporting wing, said wing having a plurality of recesses in one surface, a vane member comprising an inner and an outer hinged section in each of said recesses, one edge of each of said vane members being hinged to said wing, each of said vanes being movable from an unobstructive airflow position to an obstructive airflow position, means connected to the outer of said hinged sections and operable from said cockpit to actuate said vanes independently and means to actuate all of said vanes simultaneously.

10. In combination with an airplane including a control cockpit and a supporting wing, said wing having a plurality of recesses in one surface, a vane member positioned in each of said recesses, each of said vanes including two sections hinged together and with one of said vane sections hinged to said wing, said vanes being movable from closed position to open position, said vanes in closed position being folded within said recesses with the outer surface of the outer sections of said vanes flush with the adjacent outer surface of said wing, said vanes when in open position having their inner sections inclined away from said wing towards one edge of said wing and having the outer vane sections inclined away from said wing towards the opposite edge of said wing, actuating means operable from said cockpit to independently actuate each of said vanes from closed position to open position, other actuating means to independently actuate each of said vanes from open position to closed position and means to actuate said vanes simultaneously.

11. In combination with an airfoil, said airfoil having a recess, a vane member positioned in said recess, said vane including two sections hinged together and with one of said sections hinged to said airfoil, said vane being movable from an unobstructive airflow position to an obstructive airflow position, a brace member pivoted at one end to the outer of said vane sections and pivoted at the opposite end to said airfoil, said brace acting to cause the pressure of air against the outer of said vane sections to counteract the pressure of air against the other of said vane sections.

12. In combination with an airplane including a control cockpit and a supporting wing, said wing having a plurality of recesses in one surface, a vane member in each of said recesses, one edge of each of said vanes being hinged to said wing, each of said vanes being movable from an unobstructive airflow position to an obstructive airflow position, a pilot flap in each of said recesses, said pilot flaps being of less area than said vane members, the leading edge of said pilot flaps being hinged to said wing, said pilot flaps being movable from an unobstructive airflow position to an obstructive airflow position, means operable from said cockpit to actuate said pilot flaps independently or simultaneously and means operable from said cockpit to actuate said vanes independently or simultaneously.

13. In combination with an airplane including a control cockpit and a supporting wing, said wing having a plurality of recesses in one surface, a vane member positioned in each of said recesses and hinged to said wing, said vanes being movable from closed position to open position, said vanes in closed position being folded within said recesses with the outer surface of said vanes flush with the adjacent outer surface of the said wing, said vanes when in open position being inclined and a pilot flap positioned in each of said recesses forward of said vanes, the edge of said pilot flaps towards the leading edge of said wing being hinged to said wing, the area of said pilot flaps being less than the area of said vanes, said pilot flaps being movable from unobstructive airflow position in said recesses to obstructive airflow position.

14. In combination with an airplane including a control cockpit and a supporting wing, said wing having a plurality of recesses in one surface, a vane member positioned in each of said recesses, each of said vanes including two sections hinged together and with one of said vane sections hinged to said wing, said vanes being movable from closed position to open position, said vanes in closed position being folded within said recesses with the outer surface of the outer sections of said vanes flush with the adjacent outer surface of said wing, said vanes when in open position having their inner sections inclined away from said wing towards one edge of said wing and having the outer vane sections inclined away from said wing towards the opposite edge of said wing, a pilot flap pivotally mounted directly in advance of each of said vanes, selective means operable from said cockpit to independently or simultaneously actuate said vanes from closed position to open position and from open position to closed position and selective means operable from said cockpit to independently or simultaneously actuate said pilot flaps from unobstructive airflow positions to obstructive airflow position and from obstructive airflow positions to unobstructive airflow position.

15. In combination with an airplane including a control cockpit and a supporting wing, said wing having a plurality of recesses in one surface, a vane member positioned in each of said recesses, each of said vanes including two sections hinged together and with one of said vane sections hinged to said wing, said vanes being movable from closed position to open position, said vanes in closed position being folded within said recesses with the outer surface of the outer sections of said vanes flush with the adjacent outer surface of said wing, said vanes when in open position having their inner sections inclined away from said wing towards one edge of said wing and having the outer vane sections inclined away from said wing towards the opposite edge of said wing, a pilot flap positioned in each of said recesses forward of said vanes, the edge of said pilot flaps towards the leading edge of said wing being hinged to said wing, the area of said pilot flaps being less than the area of said vanes, said pilot flaps being movable from unobstructive airflow position in said recesses to obstructive airflow position.

16. The combination of an airfoil including a leading edge and a trailing edge, and a vane member, said vane member comprising a pair of sections having their end edges hinged together, means to pivotally secure the free edge of one of said vane sections to said airfoil so that said one section may fold upon the airfoil, and means to swing said vane member outward from a position upon the airfoil.

17. In combination with an airfoil including a leading edge and a trailing edge, said airfoil having a recess in the surface thereof, a vane member comprising a pair of sections having their ends hinged together and positioned in said recess, means to pivotally secure the end portion of one of said vane sections to said airfoil and means to swing said one vane section outward from a position in said recess, one of said vane sections being longer than the other.

18. The combination of an airplane including a control cockpit and a supporting wing, and a vane member including two sections, a hinge connecting said sections at their end edges to form a V, a hinge connecting one of said vane sections to said wing on a hinge line in advance of said first mentioned hinge whereby the apex of the V is to the rear, said vanes being movable from closed position to open position, and brace means connecting one of said vane sections to said wing to partly remove the load from said one vane section.

19. The combination of an airplane including a control cockpit and a supporting wing, and a vane member including two sections, a hinge connecting said sections at their end edges to form a V, a hinge connecting one of said vane sections to said wing on a hinge line in the rear of said first mentioned hinge whereby the apex of the V is to the front, said vanes being movable from closed position to open position, and brace means connecting one of said vane sections to said wing to partly remove the load from said one vane section.

20. The combination of an airplane including a control cockpit and a supporting wing, and a vane member, said vane member including an inner and an outer section, a hinge connecting said sections along their extreme end edges, means connecting one of said vane sections to said wing on a hinge line adjacent to said wing and in advance of said first mentioned hinge, whereby said hinges form a substantially V-shaped pocket, the apex of the pocket being to the rear whereby air entering the lower and middle portion of said pocket will flow forwardly over the free edge of said outer vane section, and means to move said vanes from open position to closed position.

21. An airfoil including a leading edge, a trailing edge, an upper surface and a lower surface, said airfoil having a passageway intermediate said leading edge and said trailing edge, said passageway opening through said upper surface and through said lower surface, a movable closure member hinged adjacent the upper end of said passageway and a movable closure member hinged adjacent the lower end of said passageway, one of said closure members including a pair of vane sections hinged to each other and both movable into the air stream which flows over the upper surface of the airfoil, the other closure members including a pair of vane sections with one section hinged to the end of the other section and both movable into the air stream which flows over the lower surface of the airfoil, means to move said closure members from closed positions to open positions, said closure members when in closed positions restricting entrance into said passageway and when in open positions allowing entrance into said passageway.

GEORGE E. BARNHART.